US012569406B2

(12) United States Patent
Darst et al.

(10) Patent No.: US 12,569,406 B2
(45) Date of Patent: Mar. 10, 2026

(54) AM/PM MULTI-DAY PILL CONTAINER

(71) Applicant: Apothecary Products, LLC, Burnsville, MN (US)

(72) Inventors: Daniel Darst, Zimmerman, MN (US); Julia Olson Augdahl, Prior Lake, MN (US)

(73) Assignee: Apothecary Products, LLC, Burnsville, MN (US)

( * ) Notice: Subject to any disclaimer, the term of this patent is extended or adjusted under 35 U.S.C. 154(b) by 0 days.

(21) Appl. No.: 18/647,750

(22) Filed: Apr. 26, 2024

(65) Prior Publication Data

US 2025/0332069 A1 Oct. 30, 2025

(51) Int. Cl.
*A61J 1/03* (2023.01)
*A61J 7/04* (2006.01)

(52) U.S. Cl.
CPC ........................................ *A61J 7/04* (2013.01)

(58) Field of Classification Search
CPC .... A61J 1/03; A61J 7/04; A61J 7/0084; A61J 7/0076
USPC .................. 206/528, 538, 534, 818; 220/507
See application file for complete search history.

(56) References Cited

U.S. PATENT DOCUMENTS

| | | | | | |
|---|---|---|---|---|---|
| 4,261,468 | A | | 4/1981 | Krebs | |
| D278,513 | S | * | 4/1985 | Ebeling | D9/600 |
| D321,788 | S | | 11/1991 | Chen | |
| D328,703 | S | | 8/1992 | Klumpyan | |
| D380,149 | S | | 6/1997 | Alexander | |
| 5,782,359 | A | * | 7/1998 | McAllister | B65D 41/06 206/1.5 |
| 6,003,467 | A | * | 12/1999 | Shelton-Ferrell | G09F 11/23 116/315 |
| D451,666 | S | | 12/2001 | Zastrow | |
| D458,016 | S | | 6/2002 | Christianson | |
| D459,873 | S | | 7/2002 | Stillwell et al. | |
| D473,786 | S | | 4/2003 | Chue | |
| D514,804 | S | | 2/2006 | Harvie et al. | |
| 7,128,213 | B2 | * | 10/2006 | Tung | A61J 7/04 220/524 |
| 7,156,226 | B1 | * | 1/2007 | Van Sickle | A47J 47/16 206/1.5 |
| D563,095 | S | | 3/2008 | Sabbag | |
| D608,220 | S | | 1/2010 | Gaa et al. | |
| 7,854,326 | B1 | * | 12/2010 | Beckett | A61J 7/0084 206/534 |
| 8,201,691 | B1 | * | 6/2012 | Chowdhury | A61J 1/03 116/306 |
| 10,442,592 | B2 | * | 10/2019 | Afif | B65D 55/14 |
| D901,166 | S | | 11/2020 | Schepley et al. | |
| D917,153 | S | | 4/2021 | Denei et al. | |
| 11,191,702 | B2 | * | 12/2021 | Zonana | A61J 7/0084 |

(Continued)

*Primary Examiner* — Steven A. Reynolds
(74) *Attorney, Agent, or Firm* — Merchant & Gould P.C.

(57) ABSTRACT

A container for organized storage and selective accessibility of items, such as medications. The container includes a base with a base plate and a central base hub, supporting the plurality of pill cases, each with a truncated sector shape and partitioned into two compartments accessible from opposing ends. The container incorporates a magnetic coupling system, comprising a plurality of primary magnetic elements on the base hub and a plurality of secondary magnetic elements on the pill cases, thereby enabling each pill case to attach to the base in one of two orientations, providing access to either compartment.

18 Claims, 9 Drawing Sheets

(56) References Cited

U.S. PATENT DOCUMENTS

| | | | | |
|---|---|---|---|---|
| 11,213,146 | B1 * | 1/2022 | Sletten | B65D 47/261 |
| D943,268 | S | 2/2022 | Guo et al. | |
| 11,365,037 | B2 * | 6/2022 | Afif | A61J 1/03 |
| D964,016 | S | 9/2022 | Chen | |
| D968,071 | S | 11/2022 | Li | |
| 2005/0269237 | A1 * | 12/2005 | Tung | A61J 7/04<br>206/533 |
| 2007/0138048 | A1 * | 6/2007 | Coe | A61J 7/04<br>206/528 |

* cited by examiner

AM/PM MULTI-DAY PILL CONTAINER

TECHNICAL FIELD

The present disclosure relates generally to storage containers, and more particularly to modular pill containers with configurable compartment access facilitated by a magnetic coupling system.

BACKGROUND

The management of medication, particularly for individuals with multiple prescriptions, presents challenges in terms of organization, timing, and dosage accuracy. Traditional pill containers often lack flexibility, offering only basic compartmentalization that does not account for varying daily medication needs or the necessity to segregate doses by time of day. Additionally, current solutions can be cumbersome for users, especially those with limited dexterity or memory challenges, as they do not support easy, selective access to specific medications at needed times, complicating adherence to prescribed regimens.

SUMMARY

Aspects of the present disclosure relate to a pill container configured to enhance the management and dispensation of medications. The pill container comprises a base unit equipped with a plurality of individually detachable pill cases, each detachable pill case bisected into two distinct compartments. The two distinct compartments are accessible through a magnetic coupling system that affords secure and reversible attachment to the base into separate orientations, thereby enabling visual organization and selective access to each compartment independently, for example, depending upon the time of day.

One aspect of the present disclosure provides a container, having a base including a base plate and a base hub extending from the base plate, and seven pill cases, each pill case defined by a wall having a truncated sector shape open at a first end and a second end, wherein a partition is positioned between the first end and the second end to divide the pill case into a first compartment accessible via the first end and a second compartment accessible via the second end, seven first magnetic elements operably coupled to the base hub, and seven second magnetic elements, each second magnetic element operably coupled to a respective one of the seven pill cases, enabling each of the seven pill cases to be individually and magnetically coupled to the base in either of a first configuration enabling access to the first compartment, and a second configuration enabling access to the second compartment.

In one aspect, the base plate is substantially circular in shape.

In one aspect, the base hub extends substantially orthogonally outward from a center of the base plate.

In one aspect, the base hub is defined by a heptagon shape defining seven surfaces for positioning of each of the seven first magnetic elements.

In one aspect, the base hub is comprised of a first base hub component and a second base hub component.

In one aspect, the first base hub component is formed as a single piece, unitary component with the base plate.

In one aspect, the container further includes a fastener configured to secure the first base hub component to the second base hub component.

In one aspect, the container further includes seven first magnetic element carriers.

In one aspect, the base hub defines one or more channels configured to receive the seven first magnetic element carriers, wherein the seven first magnetic elements are positioned in the seven first magnetic element carriers, and the seven first magnetic element carriers are positioned in the one or more channels defined by the base hub.

In one aspect, each of the seven pill cases defines a channel configured to receive a respective one of the seven second magnetic elements.

In one aspect, each of the respective one of the seven first magnetic elements and the seven second magnetic elements comprise at least one of a magnet or a ferromagnetic material.

In one aspect, each of the seven pill cases are constructed of a transparent or semi-transparent material.

In one aspect, each of the seven pill cases include markings indicating a day of a week.

In one aspect, the container further includes a first lid configured to selectively close the first compartment, and a second lid configured to selectively close the second compartment.

In one aspect, the first lid and the second lid are constructed of a resilient material configured to mate with each of the first end and the second end of each of the seven pill cases.

In one aspect, the first lid includes a first marking indicating a first time of day, and the second lid includes a second marking including a second time of day.

Another aspect of the present disclosure provides a method of assembling a container, including the steps of: providing a base including a base plate and a base hub extending from the base plate; providing seven pill cases, each pill case defined by a wall having a truncated sector shape open at a first end and a second end, wherein a partition is positioned between the first end and the second end to divide the pill case into a first compartment accessible via the first end and a second compartment accessible via the second end; positioning seven first magnetic elements within seven first magnetic element carriers; positioning the seven first magnetic element carriers within one or more channels defined by the base hub; and operably coupling seven second magnetic elements to respective ones of the seven pill cases, enabling each of the seven pill cases to be individually and magnetically coupled to the base in either of a first configuration enabling access to the first compartment, and a second configuration enabling access to the second compartment.

In one aspect, positioning the seven second magnetic elements includes friction fitting each second magnetic element into a channel defined by each of the seven pill cases.

In one aspect, providing the base includes forming the base plate in a substantially circular configuration and ensuring that the base hub is centrally positioned to facilitate even distribution of each of the seven pill cases around the base hub.

In one aspect, providing the base hub includes constructing the base hub in a heptagon shape defining seven surfaces, each surface being used for positioning one of the seven first magnetic element carriers for substantially equal spacing and orientation.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
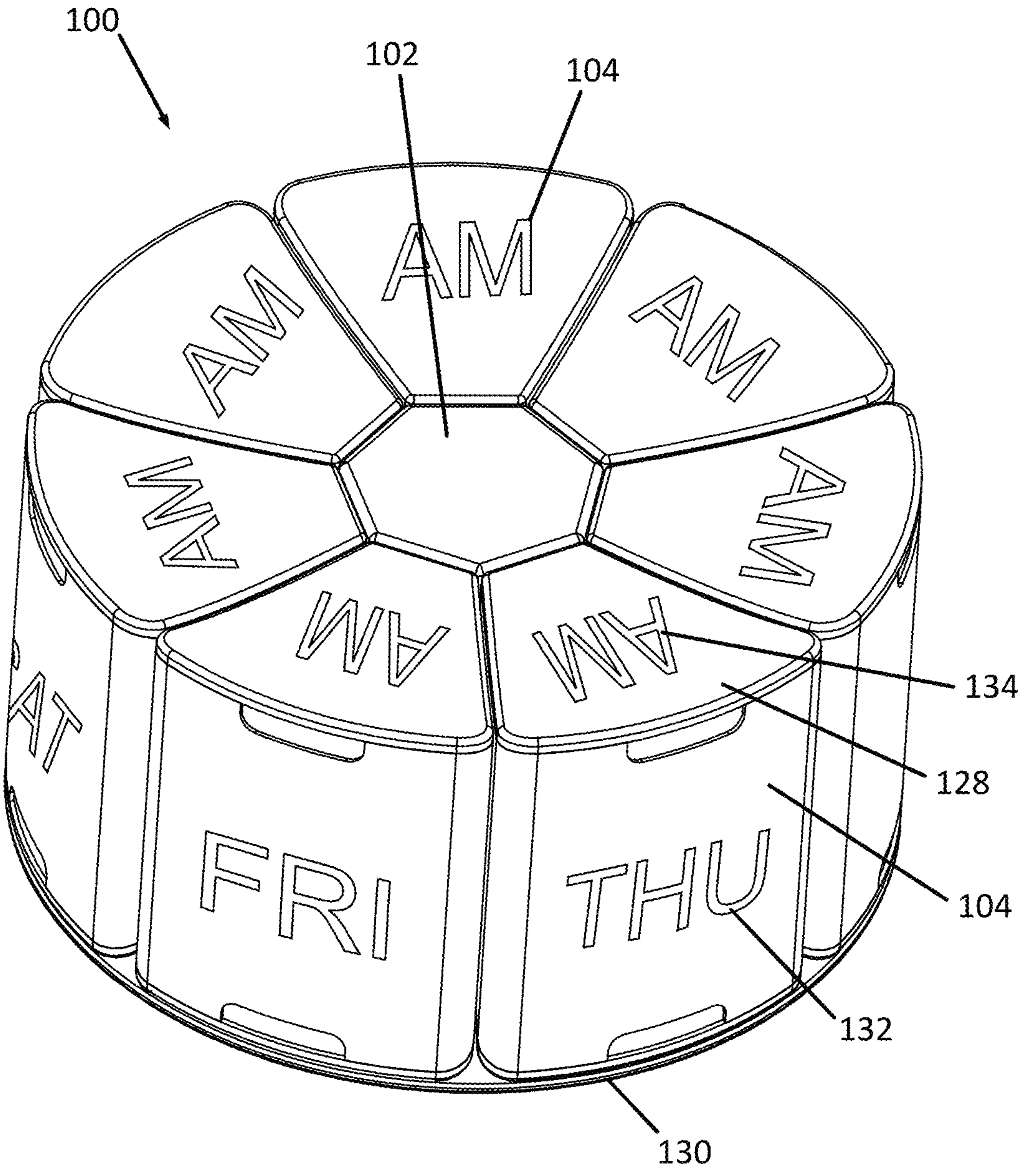
FIG. 1 is a perspective view depicting a container comprising a base and a plurality of pill cases, in accordance with an embodiment of the disclosure.

Referring to FIG. 1, a container 100 is depicted in accordance with an embodiment of the disclosure. With additional reference to FIGS. 2-3, the container 100 can include a base 102 to which a plurality of pill cases 104 can be magnetically coupled. As depicted, the container 100 can include seven pill cases 104, with each pill case designed to contain medication for each of the seven days of the week. Notably, each pill case 104 can include a calendar marking 132, for example indicating a day of the week (e.g., MON, TUE, WED, THU, FRI, SAT, SUN), facilitating weekly organization.

Additionally, each pill case 104 can be divided into a first compartment 118, for example configured to store medications intended for a first, morning administration, and a second compartment 120, for example configured to store medications intended for a second, afternoon administration. Each compartment, 118 and 120, can be equipped with a corresponding lid, including a first lid 128 and a second lid 130, respectively, which can include markings 134 and 136 indicating the time of day (e.g., AM, PM) for medication administration.

While the illustrated container 100 includes seven pill cases 104, corresponding to the seven days of the week, alternative configurations are also contemplated. For instance, embodiments may include three, four, five, six, eight, or more pill cases 104. Such embodiments may cater to specific needs, such as a "weekend" embodiment comprising only two or three pill cases 104, which could be advantageous for users who require a simplified regimen on weekends. Additionally, an embodiment divisible into quarters may feature four pill cases 104, each potentially equipped with one or more sub-compartments, to allow for granularity in medication management, accommodating different times of the day or specific conditions requiring multiple medications. Another embodiment can feature an eighth pill case 104, providing extra storage for additional pills or supplements.

Accordingly, variations in the container 100 are possible, including configurations with different numbers of pill cases 104, such as three for weekend use, or eight for an extended week, and adjustable compartment sizes for varying pill dimensions, among others. However, the particular one shown in the FIGS. 1-12 is preferred because it is eye-catching and attractive, in addition to being distinctive in appearance.

Figure 2:
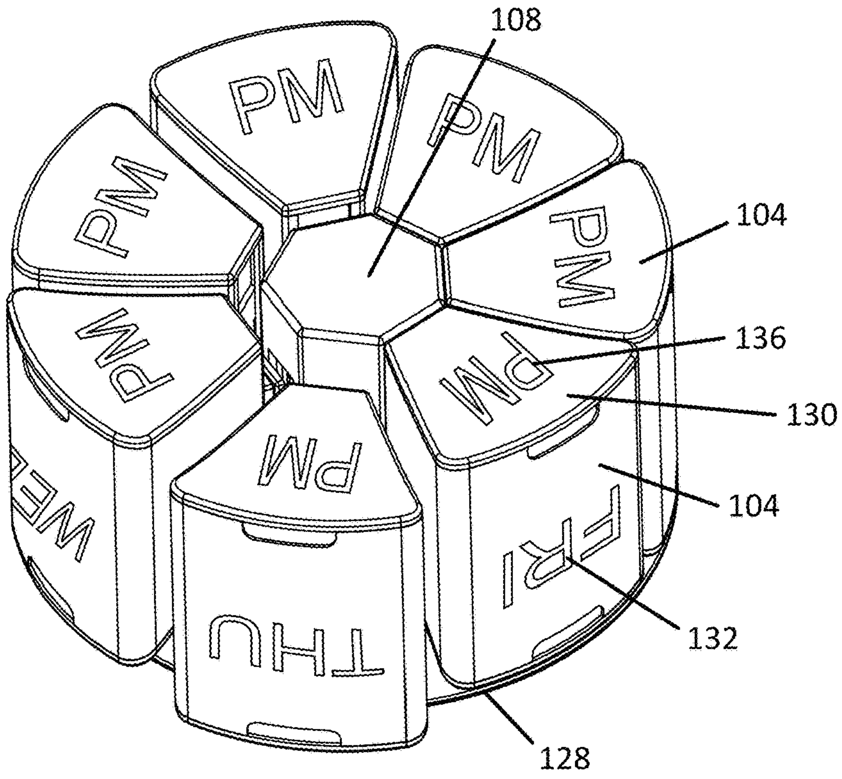
FIG. 2 is a perspective view depicting the container of FIG. 1, wherein several ones of the plurality of pill cases are detached from the base.
Figure 3:
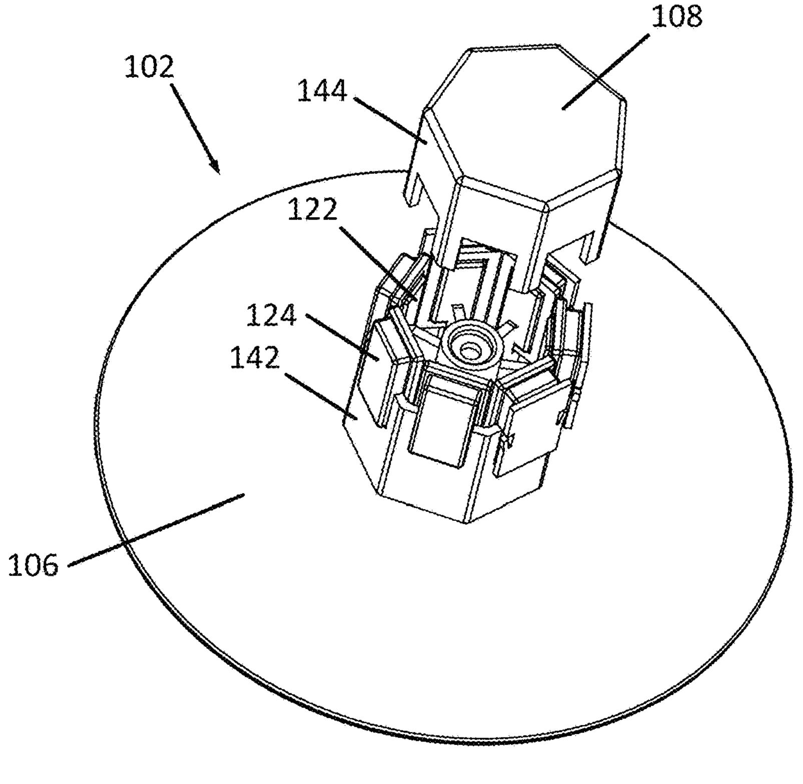
FIG. 3 is a partially exploded, perspective view of the base of FIG. 2, comprising a base plate, a base hub and a plurality of first magnetic elements.

The magnetic coupling system can include a plurality of first magnetic elements 122 affixed to the base 102, and a corresponding plurality of second magnetic elements 126 affixed to each pill case 104. The first and second magnetic elements 122, 126, which can be either of a magnet or ferromagnetic material (e.g., a metal plate), enable the pill cases 104 to be selectively attached to the base 102 in either a first configuration, providing access to the first compartment 118 as illustrated in FIG. 1, or a second configuration, facilitating access to the second compartment 120 as illustrated in FIG. 2.

As depicted, the plurality of pill cases 104 can be arranged in a circular configuration surrounding a base hub 108 and resting upon a base plate 106. This arrangement facilitates the visual organization of prescribed medications for morning (a.m.) and afternoon (p.m.) doses throughout the week, and provides an immediate visual reference to track the progress of medication administration.

Figure 6:
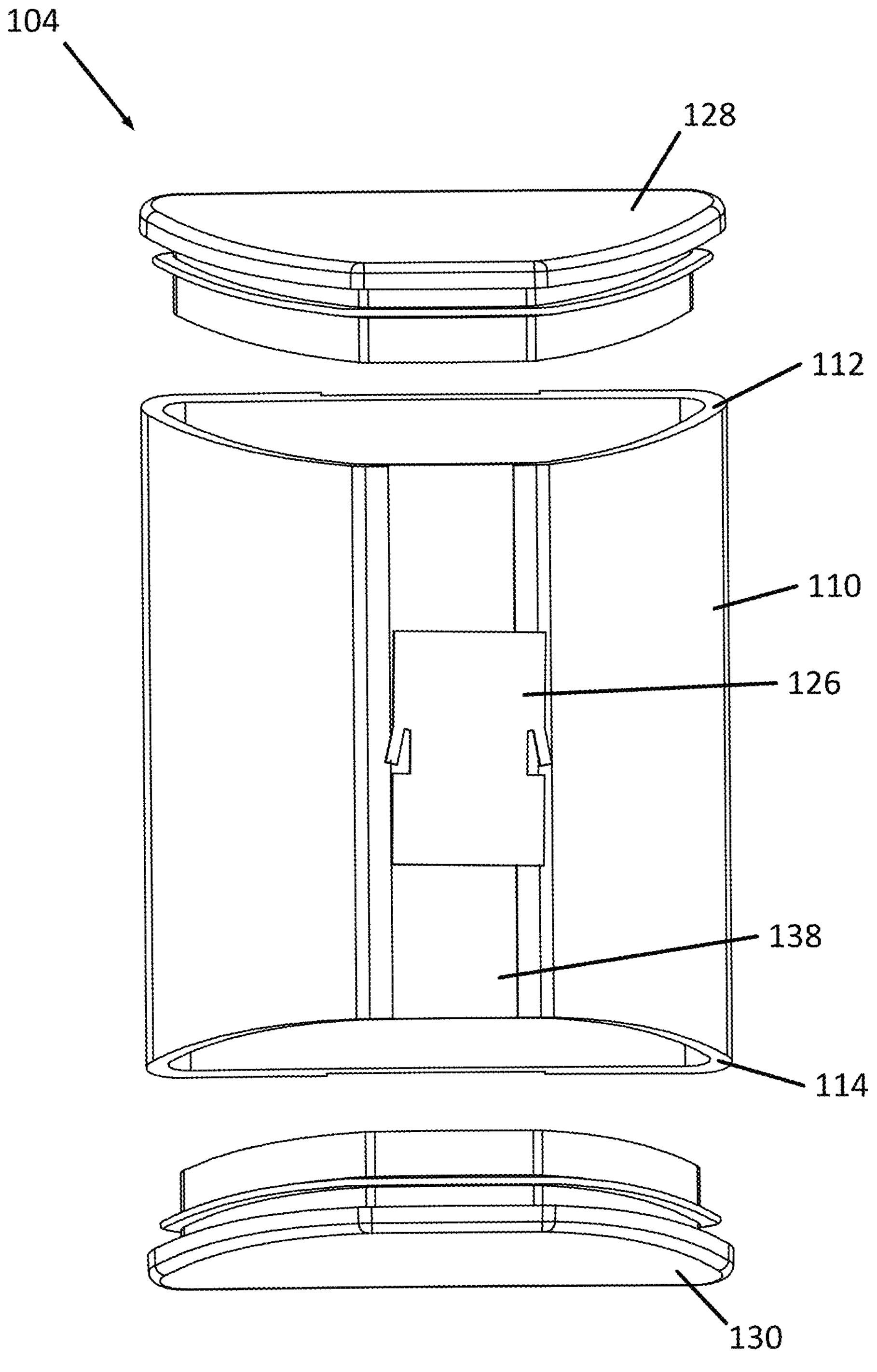
FIG. 6 is a profile view depicting a pill case, including a first lid, a second lid and a second magnetic element, in accordance with an embodiment of the disclosure.
Figure 7:
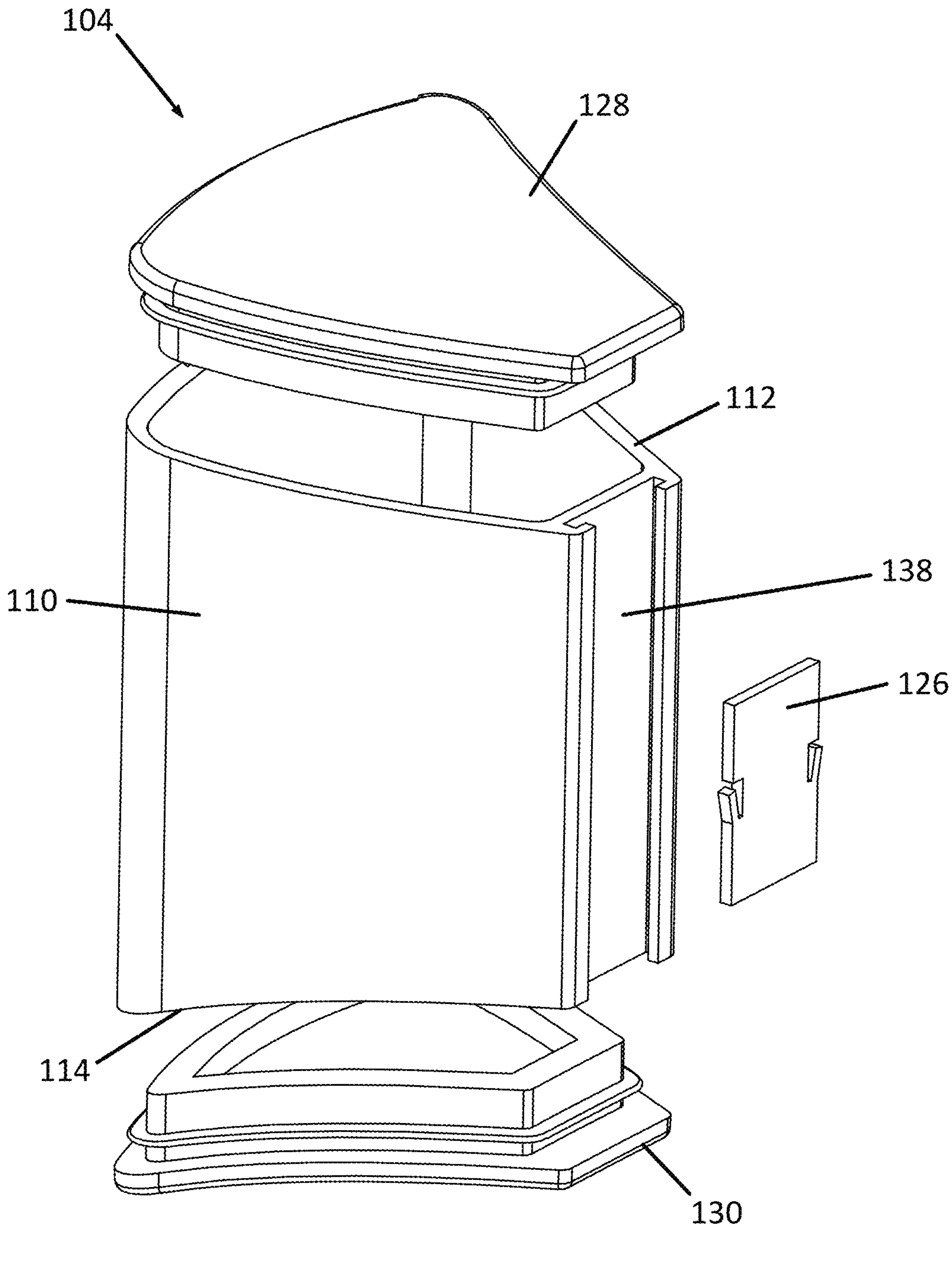
FIG. 7 is a perspective view depicting the pill case of FIG. 6.
Figure 8:
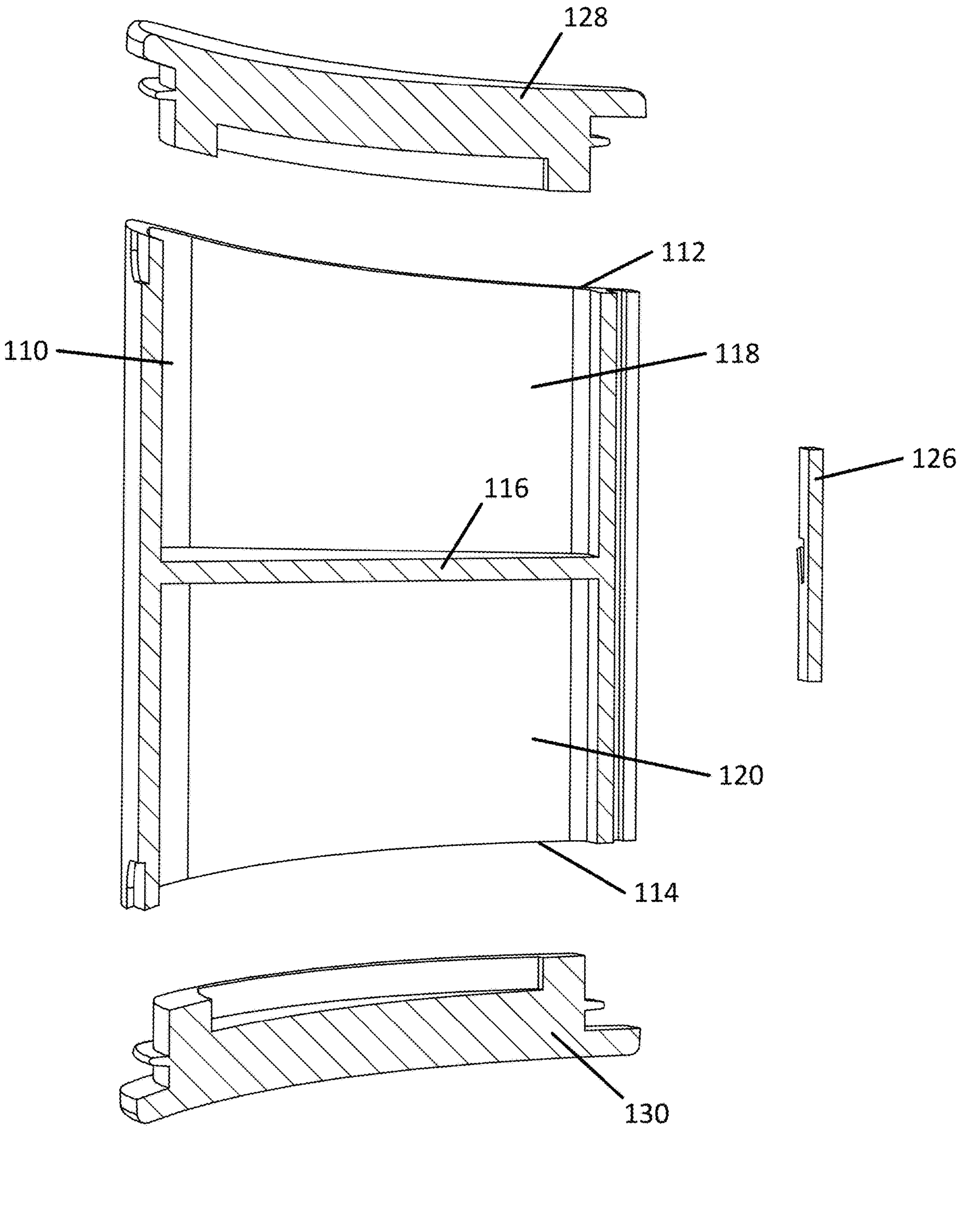
FIG. 8 is a cross-sectional view depicting the pill case of FIG. 6.
Figure 9:
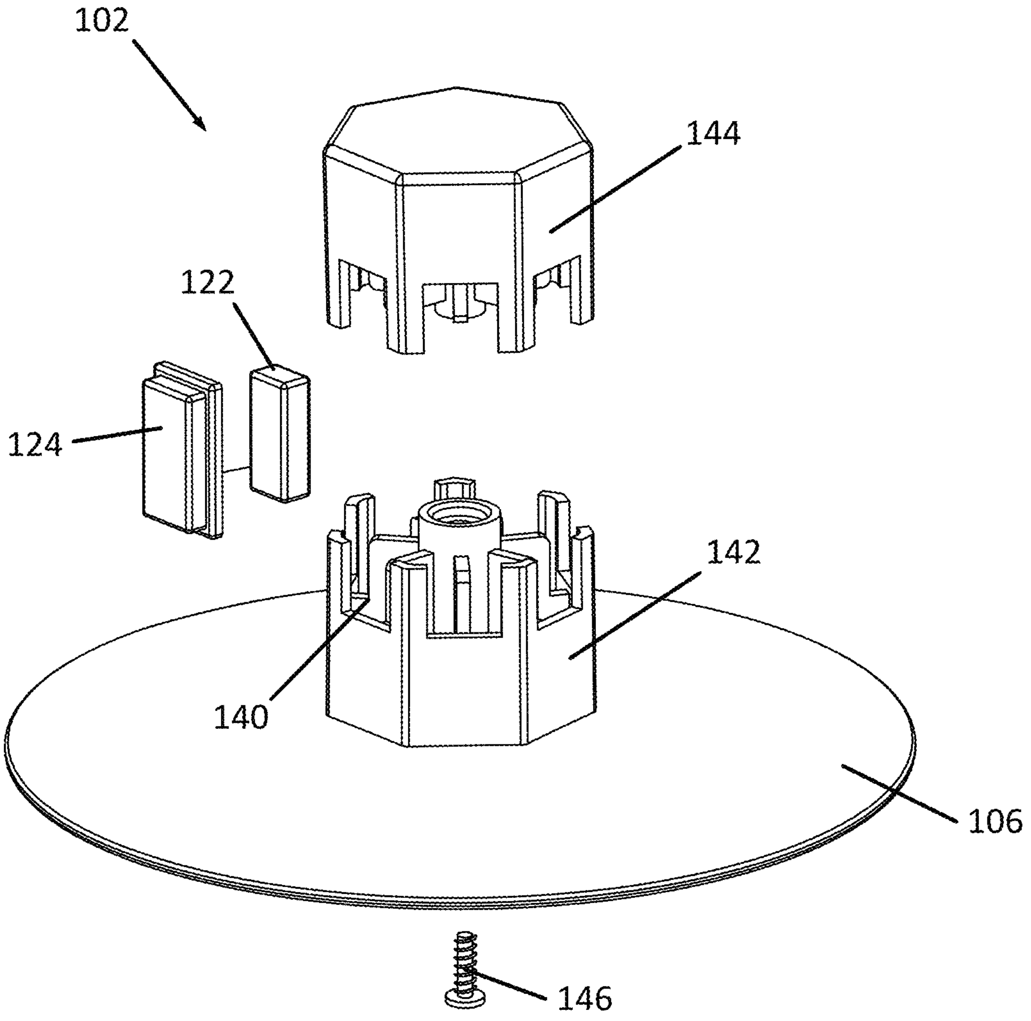
FIG. 9 is a partially exploded, perspective view of a base comprising a first base hub component and a second base hub component configured to receive a first magnetic element and a first magnetic element carrier, in accordance with an embodiment of the disclosure.
Figure 10:
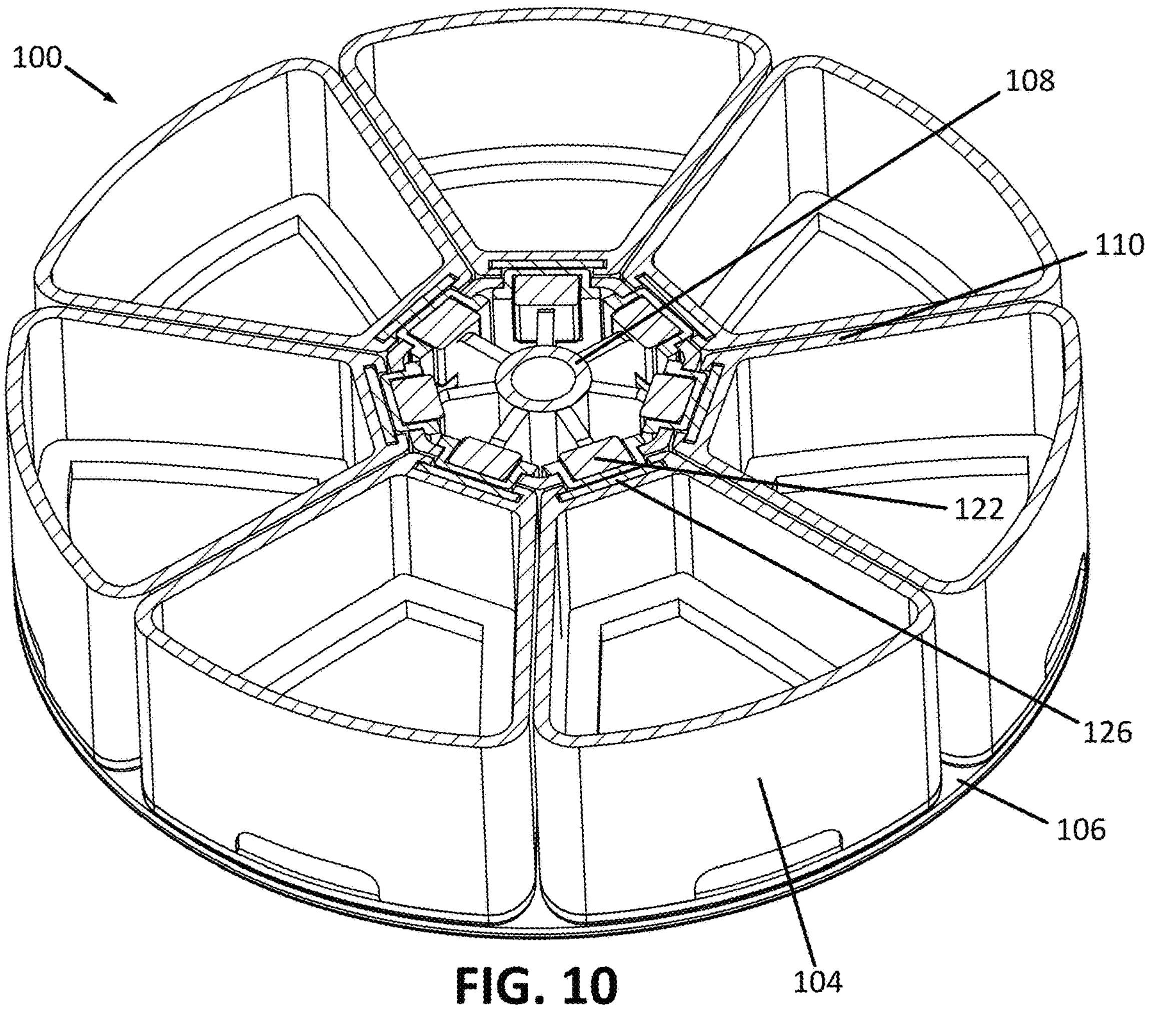
FIG. 10 is a cross-sectional, perspective view of an assembled container comprising a magnetic coupling system, in accordance with an embodiment of the disclosure.
Figure 11:
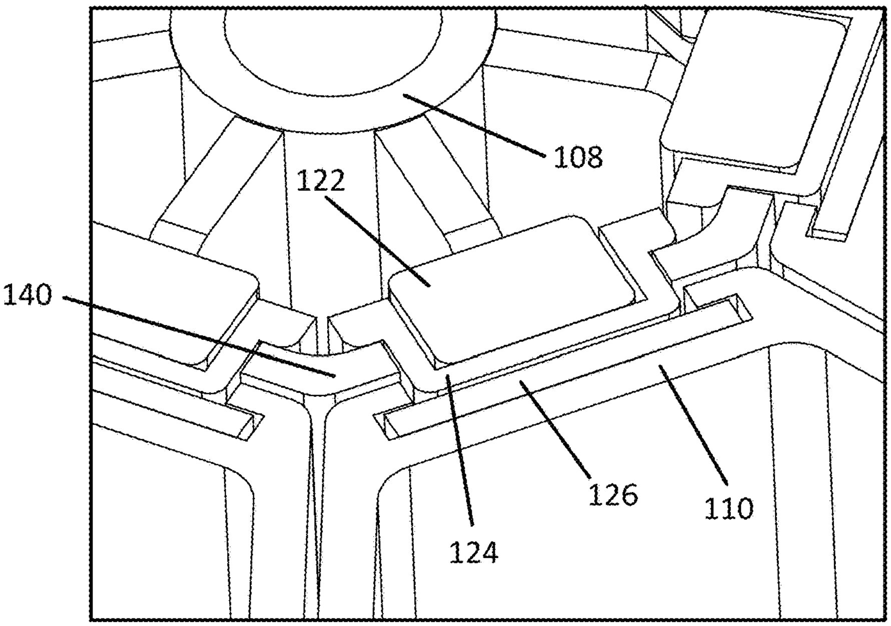
FIG. 11 is a close-up, cross-sectional, perspective view depicting the magnetic coupling system of FIG. 10.
Figure 12:
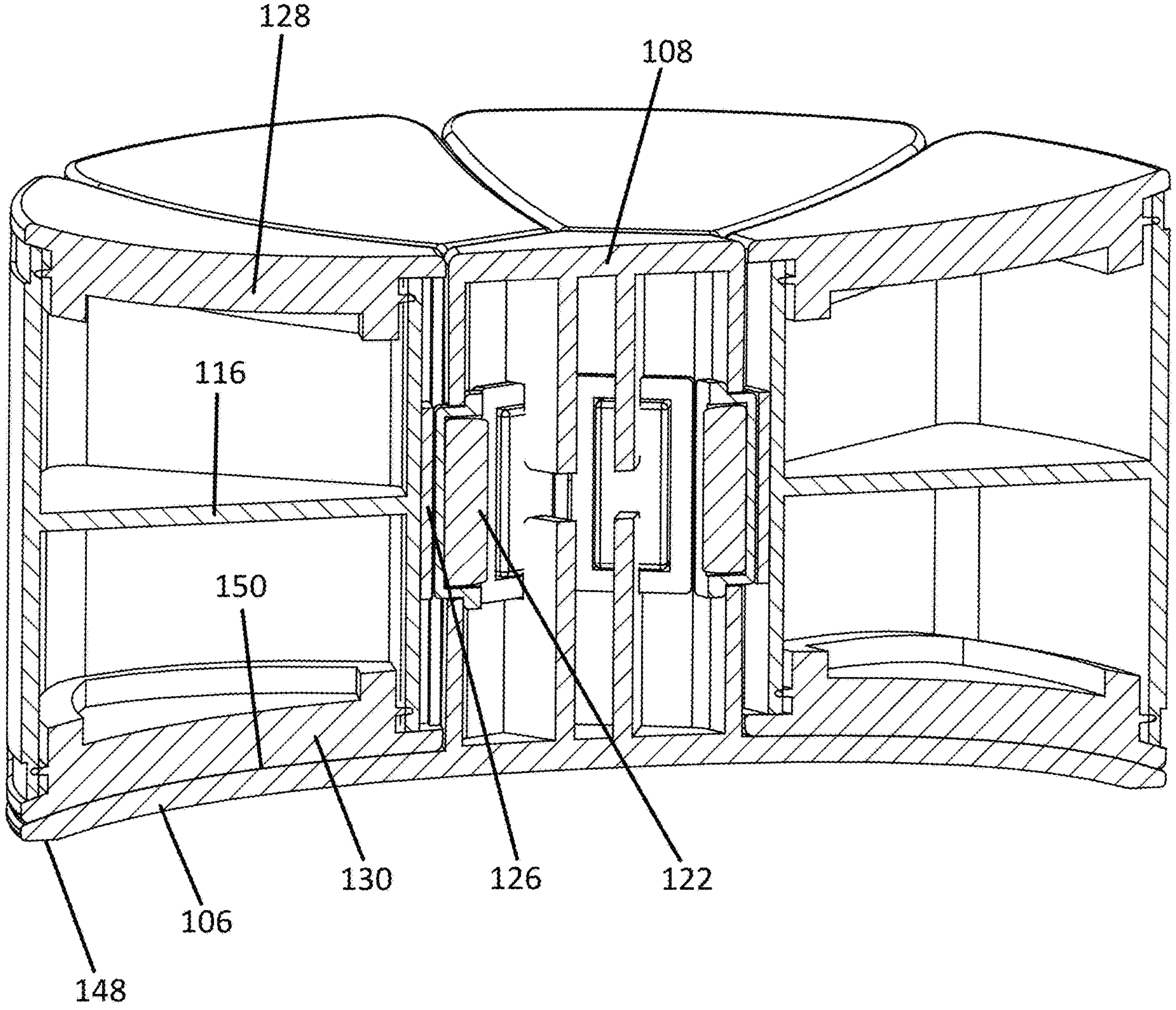
FIG. 12 is a cross-sectional, profile view depicting an assembled container comprising a magnetic coupling system, in accordance with an embodiment of the disclosure.

With additional reference to FIGS. 6-8, each pill case 104 can be defined by a wall 110, which can assume a truncated sector shape, enhancing the compactness and ergonomic utility of the container 100. In one embodiment, each pill case 104 can be constructed from an extrusion process, forming the truncated sector-shaped tubular wall 110 with an open first end 112 and an open second end 114. As depicted, both the first end 112 and the second end 114 can be curved or nonplanar, complementing a contour of the base plate 106 of the base 102 for integration of the components when assembled.

A partition 116 can be positioned between the first end 112 and the second end 114 within each pill case 104, effectively dividing the interior 105 into a first compartment 118 accessible via the first end 112, and a second compartment 120 accessible via the second end 114. The partition 116 can facilitate distinct and isolated storage of medications intended for different times of the day, enhancing organization and inhibiting cross-contamination between compartments.

As depicted, both the first end 112 and the second end 114 of each pill case 104 can be selectively sealed with corresponding lids, including a first lid 128 and a second lid 130. Each lid 128, 130 designed as a resilient plug, which can be formed of soft touch silicon or similar material, can securely seal its respective end, ensuring the contents remain protected and contained while creating a watertight seal. Alternative lid configurations are also contemplated. For example, lids may be operably coupled to the wall 110 via a living hinge or other attachment mechanism, providing flexibility in opening and securing the pill cases, thereby enhancing user accessibility and convenience.

Additionally, the tubular wall 110 of each pill case 104 can define a channel 138, configured to accommodate the second magnetic elements 126. The second magnetic element 126 can be positioned within the channel 138 and retained securely via a friction fit. The cooperative interaction between the second magnetic elements 126 and the first magnetic elements 122 affixed to the base 102 allows for the selective positioning of the pill cases 104 relative to the base, facilitating user-adjustable configurations depending on access needs.

The tubular wall 110 can also include calendar markings 132, to provide visual organization and weekly scheduling of medication administration. The first and second lids 128, 130 can be respectively marked with first and second time markings 134, 136, respectively, denoting a.m. and p.m. dosages to further assist in daily medication management.

Figure 4:
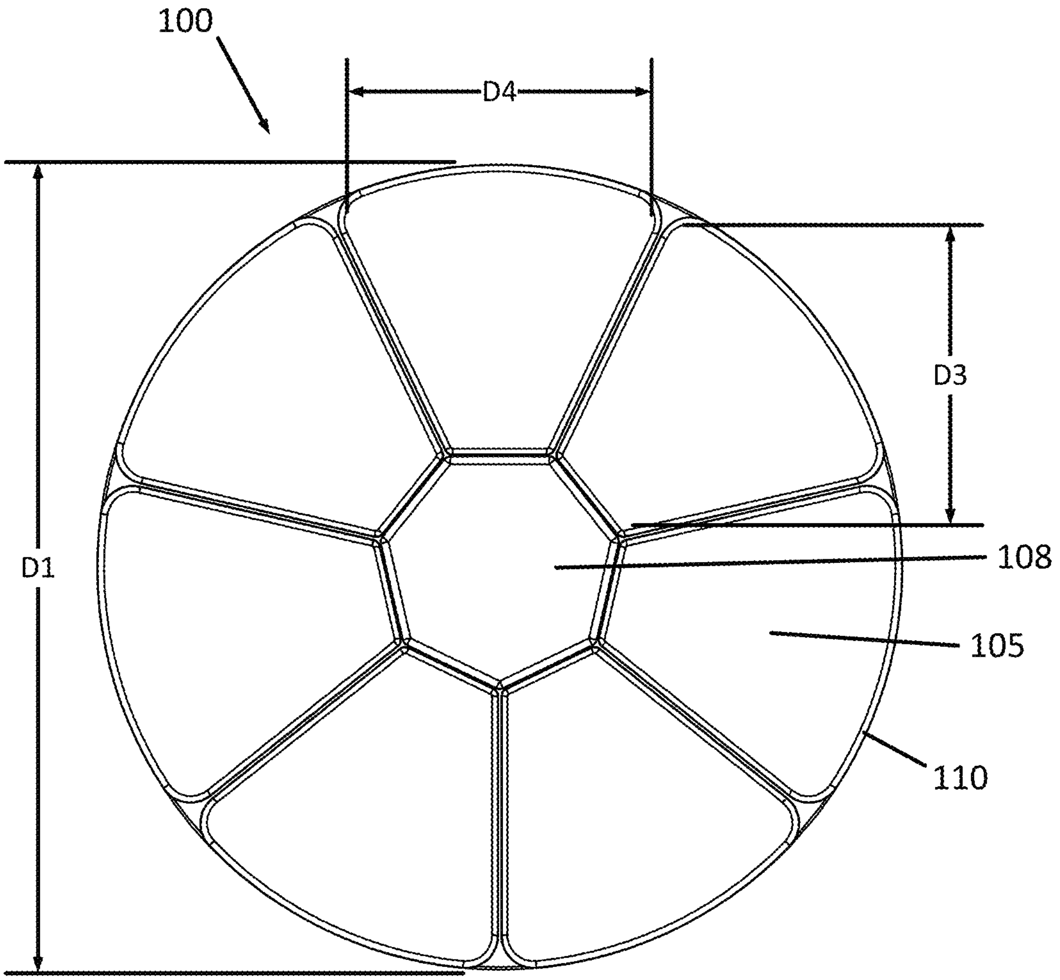
FIG. 4 is a plan view depicting dimensions of the container of FIG. 1.
Figure 5:
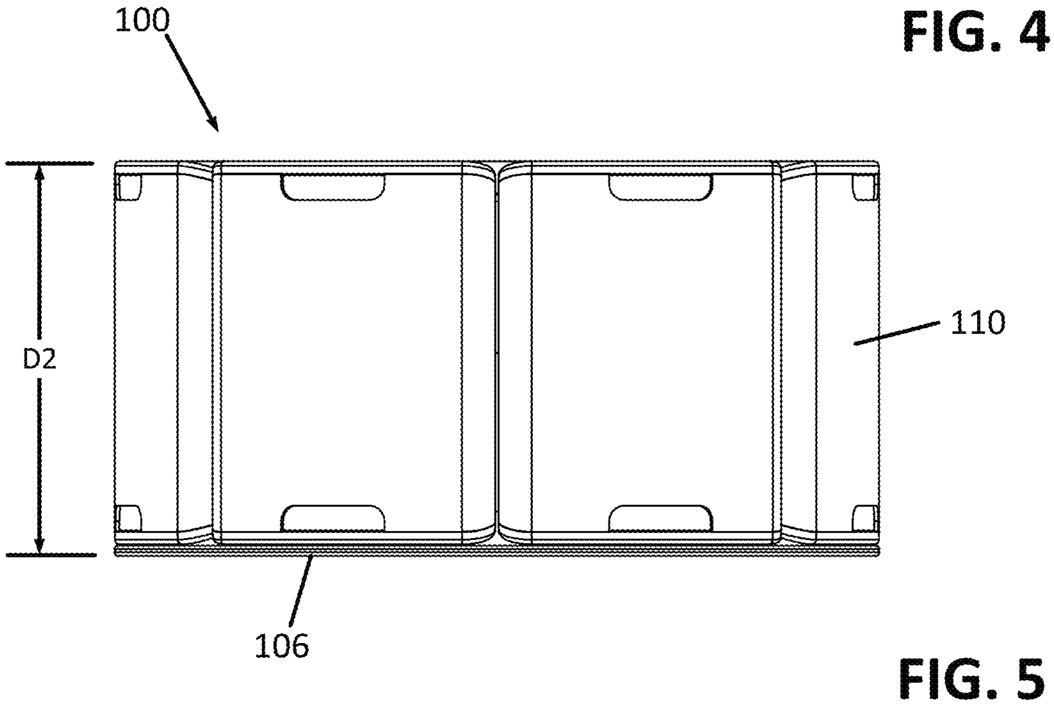
FIG. 5 is a profile view depicting dimensions of the container of FIG. 1.

With additional reference to FIGS. 4-5, the dimensions of pill cases 104 can be tailored to accommodate various sizes of pills or medications. For instance, in one embodiment, the container 100 may exhibit a first diameter measurement (D1) of approximately 100 mm and a height (D2) of about 51 mm. The interior 105 of each pill case 104 can have a width (D3) of about 29 mm and a maximum internal dimension (D4) of about 36 mm, though other dimensions are contemplated to suit different needs. Additionally, the construction of the pill case 104 from transparent or semi-transparent materials allows for the visual identification of the contents, enhancing convenience and safety in medication handling.

With additional reference to FIGS. 9-12, the base plate 106 of the container can be substantially circular in shape, featuring a first major surface 148 designed to make contact with a supporting surface to stabilize the container 100. A second major surface 150 of the base plate can serve as a mounting base for the pill cases 104 and may be configured with a curved or non-linear profile to accommodate the specific arrangement of the pill cases.

The base hub 108 can project substantially orthogonally from the center of the base plate 106, and can have a heptagonal shape, defining seven surfaces, with each surface serving as a positioning point for one of the first magnetic elements, ensuring alignment and spacing.

In terms of construction, the base hub 108 can include two main components: a first base hub component 142 and a second base hub component 144. In some embodiments, the first base hub component 142 can be integrally formed as a single, unitary component with the base plate 106. A fastener 146 can be employed to securely attach the first base hub component 142 to the second base hub component 144.

Furthermore, the base hub 108 can be designed with one or more channels 140 located between the first and second base hub components 142, 144. These channels 140 can be configured to house the first magnetic element carriers 124. The first magnetic elements 122 can be positioned within the first magnetic element carriers 124, with the first magnetic element carriers 124 positioned within the channels 140 of the base hub 108. For example, in some embodiments, the first magnetic element carriers 124 can be configured as a cradle to at least partially wrap around one or more major surfaces of the first magnetic elements 122 (e.g., to inhibit direct contact with the second magnetic element 126) and at least one side surface of the first magnetic elements 122, for example retaining the first magnetic elements 122 in a pocket defined by the first magnetic element carrier 124. A fastener 146 can be used to affix a position of both the first magnetic element carriers 124 and the first magnetic elements 122, between the first and second base hub components 142, 144 during use.

The method of assembling the container 100 commences with the provision of a base 102 that includes a base plate 106 and a base hub 108 extending therefrom. Additionally, pill cases 104 are provided, each crafted with a truncated sector-shaped wall 110, open at both a first and a second end 112, 114, with a partition 116 positioned between the two ends 112, 114, effectively dividing each pill 104 case into a first compartment 118, accessible via the first end 112, and a second compartment 120, accessible via the second end 114.

The assembly process continues with the placement of first magnetic elements 122 into corresponding first magnetic element carriers 124. These first magnetic element carriers 124 are then positioned within one or more channels 140 defined by the base hub 108, ensuring alignment and secure attachment. Thereafter, a first base hub component 142 can be operable coupled to a second base subcomponent 144, for example via a fastener 146, thereby securing the first magnetic element carriers 124 relative to the base 102.

Second magnetic elements 126 can be operably coupled to their respective pill cases 104. For example, each second magnetic element 126 can be friction-fitted into a channel 138 defined by each of the pill cases 104. This magnetic coupling arrangement allows each of the pill cases 104 to be individually and magnetically coupled to the base 102, enabling each pill 104 case to be positioned in either a first configuration, which provides access to the first compartment 118, or a second configuration, which facilitates access to the second compartment 120, making the container 100 adaptable to varying user needs and medication schedules.

The invention is further illustrated by the following embodiments: a container 100, comprising a base 102 including a base plate 106 and a base hub 108 extending from the base plate 106; a plurality of pill cases 104, each pill case 104 defined by a wall 110 having a truncated sector shape open at a first end 112 and a second end 114, wherein a partition 116 is positioned between the first end 112 and the second end 114 to divide the pill case 104 into a first compartment 118 accessible via the first end 112 and a second compartment 120 accessible via the second end 114; a plurality of first magnetic elements 122 operably coupled to the base hub 108; and a plurality of second magnetic elements 126, each second magnetic element 126 operably coupled to a respective one of the plurality of pill cases 104, enabling each of the plurality of pill cases 104 to be individually and magnetically coupled to the base 102 in either of a first configuration enabling access to the first compartment 118, and a second configuration enabling access to the second compartment 120.

A container or method of assembling a container according to any embodiment, wherein the base plate 106 is substantially circular in shape.

A container or method of assembling a container according to any embodiment, wherein the base hub 108 extends substantially orthogonally outward from a center of the base plate 106.

A container or method of assembling a container according to any embodiment, wherein 108 the base hub is defined by a heptagon shape defining seven surfaces for positioning of each of the plurality of first magnetic elements 122.

A container or method of assembling a container according to any embodiment, wherein the base hub 108 is comprised of a first base bub component 142 and a second base hub component 144.

A container or method of assembling a container according to any embodiment, wherein the first base hub component 142 is formed as a single piece, unitary component with the base plate 106.

A container or method of assembling a container according to any embodiment, further comprising a fastener 146 configured to secure the first base hub component 142 to the second base hub component 144.

A container or method of assembling a container according to any embodiment, further comprising a plurality of first magnetic element carriers 124.

A container or method of assembling a container according to any embodiment, wherein the base hub 108 defines one or more channels 140 configured to receive the plurality of first magnetic element carriers 124, wherein the plurality of first magnetic elements 122 are positioned in the plurality of first magnetic element carriers 124, and the plurality of first magnetic element carriers 124 are positioned in the one or more channels 140 defined by the base hub 108.

A container or method of assembling a container according to any embodiment, wherein each of the plurality of pill cases 104 defines a channel 138 configured to receive a respective one of the plurality of second magnetic elements 126.

A container or method of assembling a container according to any embodiment, wherein each of the respective one of the plurality of first magnetic elements 122 and the plurality of second magnetic elements 124 comprise at least one of a magnet or a ferromagnetic material.

A container or method of assembling a container according to any embodiment, wherein each of the plurality of pill cases 104 are constructed of a transparent or semi-transparent material.

A container or method of assembling a container according to any embodiment, wherein each of the plurality of pill cases 104 include markings 132 indicating a day of a week.

A container or method of assembling a container according to any embodiment, further comprising a first lid 128 configured to selectively close the first compartment 118, and a second lid 130 configured to selectively close the second compartment 120.

A container or method of assembling a container according to any embodiment, wherein the first lid 128 and the second lid 130 are constructed of a resilient material configured to mate with each of the first end 112 and the second end 114 of each of the plurality of pill cases 104.

A container or method of assembling a container according to any embodiment, wherein the first lid 128 includes a first marking 134 indicating a first time of day, and the second lid 130 includes a second marking 136 including a second time of day.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

Various embodiments of the present disclosure will be described in detail with reference to the drawings, where like reference numerals represent like parts and assemblies throughout the several views. Reference to various embodiments does not limit the scope of the invention, which is limited only by the scope of the claims attached hereto. Additionally, any example set forth in the specification is not intended to be limiting and merely sets forth some of the many possible embodiments for the claimed invention.

What is claimed is:

1. A container, comprising:

a base including a base plate and a base hub extending from the base plate;

a plurality of pill cases, each pill case defined by a wall having a truncated sector shape open at a first end and a second end, wherein a partition is positioned between the first end and the second end to divide the pill case into a first compartment accessible via the first end and a second compartment accessible via the second end;

a plurality of first magnetic elements operably coupled to the base hub;

a plurality of second magnetic elements, each second magnetic element operably coupled to a respective one of the plurality of pill cases, enabling each of the plurality of pill cases to be individually and magnetically coupled to the base in either of a first configuration enabling access to the first compartment, and a second configuration enabling access to the second compartment;

a plurality of first magnetic element carriers;

wherein the base hub defines one or more channels configured to receive the plurality of first magnetic element carriers; the plurality of first magnetic elements being positioned in the plurality of first magnetic element carriers, and the plurality of first magnetic element carriers being positioned in the one or more channels defined by the base hub.

2. The container of claim 1, wherein the base plate is substantially circular in shape.

3. The container of claim 1, wherein the base hub extends substantially orthogonally outward from a center of the base plate.

4. The container of claim 1, wherein the base hub is defined by a heptagon shape defining seven surfaces for positioning of each of the plurality of first magnetic elements.

5. The container of claim 1, wherein the base hub is comprised of a first base hub component and a second base hub component.

6. The container of claim 5, wherein the first base hub component is formed as a single piece, unitary component with the base plate.

7. The container of claim 5, further comprising a fastener configured to secure the first base hub component to the second base hub component.

8. The container of claim 1, wherein each of the plurality of pill cases defines a channel configured to receive a respective one of the plurality of second magnetic elements in the form of a metal plate.

9. The container of claim 1, wherein each of the respective one of the plurality of first magnetic elements and the plurality of second magnetic elements comprise at least one of a magnet or a ferromagnetic material.

10. The container of claim 1, wherein each of the plurality of pill cases are constructed of a transparent or semi-transparent material.

11. The container of claim 1, wherein each of the plurality of pill cases include markings indicating a day of a week.

12. The container of claim 1, further comprising a first lid configured to selectively close the first compartment, and a second lid configured to selectively close the second compartment.

13. The container of claim 12, wherein the first lid and the second lid are constructed of a resilient material configured to create a watertight seal with each of the first end and the second end of each of the plurality of pill cases.

14. The container of claim 12, wherein the first lid includes a first marking indicating a first time of day, and the second lid includes a second marking including a second time of day.

15. A method of assembling a container, comprising:

providing a base including a base plate and a base hub extending from the base plate;

providing a plurality of pill cases, each pill case defined by a wall having a truncated sector shape open at a first end and a second end, wherein a partition is positioned between the first end and the second end to divide the pill case into a first compartment accessible via the first end and a second compartment accessible via the second end;

positioning a plurality of first magnetic elements within a plurality of first magnetic element carriers;

positioning the plurality of first magnetic element carriers within one or more channels defined by the base hub, wherein the base hub defines the one or more channels configured to receive the plurality of first magnetic element carriers, and wherein the plurality of first magnetic elements are positioned in the plurality of first magnetic element carriers; and operably coupling a plurality of second magnetic elements to respective ones of the plurality of pill cases, enabling each of the plurality of pill cases to be individually and magnetically coupled to the base in either of a first configuration enabling access to the first compartment, and a second configuration enabling access to the second compartment.

16. The method of claim 15, wherein positioning the plurality of second magnetic elements includes friction fitting each second magnetic element into a channel defined by each of the plurality of pill cases.

17. The method of claim 15, wherein providing the base includes forming the base plate in a substantially circular and ensuring that the base hub is centrally positioned to facilitate even distribution of each of the plurality of pill cases around the base hub.

18. The method of claim 15, wherein providing the base hub includes constructing the base hub in a heptagon shape defining seven surfaces, each surface being used for positioning one of the plurality of first magnetic element carriers for substantially equal spacing and orientation.

* * * * *